US009048950B2

(12) United States Patent
Chen et al.

(10) Patent No.: US 9,048,950 B2
(45) Date of Patent: Jun. 2, 2015

(54) MULTIPLE-INPUT METHOD AND APPARATUS OF FREE-SPACE OPTICAL COMMUNICATION

(75) Inventors: Young-kai Chen, Berkeley Heights, NJ (US); Noriaki Kaneda, Westfield, NJ (US); Alex Pidwerbetsky, Randolph, NJ (US)

(73) Assignee: LGS INNOVATIONS LLC, Herndon, VA (US)

( * ) Notice: Subject to any disclaimer, the term of this patent is extended or adjusted under 35 U.S.C. 154(b) by 268 days.

(21) Appl. No.: 12/915,506

(22) Filed: Oct. 29, 2010

(65) Prior Publication Data

US 2012/0008961 A1     Jan. 12, 2012

Related U.S. Application Data

(60) Provisional application No. 61/362,201, filed on Jul. 7, 2010.

(51) Int. Cl.
*H04B 10/00*     (2013.01)
*H04B 10/112*     (2013.01)

(52) U.S. Cl.
CPC .................................. *H04B 10/1121* (2013.01)

(58) Field of Classification Search
USPC ................................................. 398/118–131
See application file for complete search history.

(56) References Cited

U.S. PATENT DOCUMENTS

| | | | | |
|---|---|---|---|---|
| 3,875,534 A | * | 4/1975 | Haven | 398/119 |
| 5,388,088 A | * | 2/1995 | Gans et al. | 398/65 |
| 6,122,084 A | * | 9/2000 | Britz et al. | 398/131 |
| 6,731,878 B1 | * | 5/2004 | Britz et al. | 398/96 |
| 7,106,971 B1 | * | 9/2006 | Davis | 398/125 |
| 7,116,909 B2 | * | 10/2006 | Aburakawa et al. | 398/115 |
| 7,277,644 B2 | * | 10/2007 | Johnson et al. | 398/158 |

(Continued)

FOREIGN PATENT DOCUMENTS

| | | |
|---|---|---|
| JP | 2005006017 A | 1/2005 |
| WO | 2009/095428 A1 | 8/2009 |
| WO | PCT/US2011/042562 | 10/2011 |

OTHER PUBLICATIONS

Ishimaru, Akira: Wave Propagation and Scattering in Random Media. Vol. 2, 1978,—10 pages.

(Continued)

*Primary Examiner* — Agustin Bello
(74) *Attorney, Agent, or Firm* — Baker & Hostetler LLP (57) ABSTRACT

An approach is provided that uses diversity to compensate fading of free-space optical (FSO) signals propagating through an environment characterized by atmospheric scintillation. One embodiment involves collecting at least one FSO beam, demultiplexing the beam by wavelength into at least two sub-beams, detecting each sub-beam to produce an electrical output therefrom, and recovering a signal using complementary information from at least two of the electrical outputs. Another embodiment involves collecting the FSO beam onto an array of spatially separated sub-apertures, detecting the light entering each sub-aperture to produce an electrical output therefrom, and recovering a signal using complementary information from at least two of the electrical outputs. This second embodiment enables both electronic adaptive processing to coherently integrate across the sub-apertures and in the case of multiple transmit apertures a free space optical Multiple Input Multiple Output (MIMO) system.

20 Claims, 4 Drawing Sheets

(56) References Cited

U.S. PATENT DOCUMENTS

| | | | |
|---|---|---|---|
| 7,406,261 B2* | 7/2008 | Shattil | 398/76 |
| 7,778,548 B2* | 8/2010 | Yamamoto | 398/78 |
| 8,098,767 B2* | 1/2012 | Mirbagheri et al. | 375/316 |
| 2002/0109885 A1* | 8/2002 | Aburakawa et al. | 359/172 |
| 2003/0090765 A1* | 5/2003 | Neff et al. | 359/172 |
| 2004/0042798 A1* | 3/2004 | Kehr et al. | 398/135 |
| 2006/0251421 A1* | 11/2006 | Arnon | 398/73 |
| 2007/0242955 A1* | 10/2007 | Kavehrad | 398/130 |
| 2008/0037933 A1* | 2/2008 | Furman et al. | 385/31 |
| 2008/0279558 A1* | 11/2008 | Capron et al. | 398/118 |
| 2009/0097856 A1* | 4/2009 | Sasai et al. | 398/119 |
| 2009/0185811 A1* | 7/2009 | Cho et al. | 398/214 |
| 2010/0329671 A1* | 12/2010 | Essiambre et al. | 398/44 |
| 2011/0135308 A1* | 6/2011 | Tarlazzi et al. | 398/79 |
| 2011/0200325 A1* | 8/2011 | Kobyakov et al. | 398/25 |
| 2011/0286748 A1* | 11/2011 | Davidson et al. | 398/118 |
| 2011/0286749 A1* | 11/2011 | Schoon | 398/128 |
| 2012/0008961 A1* | 1/2012 | Chen et al. | 398/119 |

OTHER PUBLICATIONS

Andrews, Larry C. et al., Laser Beam Propagation Through Random Media, 1998, pp. 1-2 and 150-152, SPIE—The International Society for Optical Engineering, Bellingham, Washington.

Office Action issued on Jan. 26, 2014, for corresponding Japanese Patent Application No. 2013-518698, 6 pgs.

* cited by examiner

MULTIPLE-INPUT METHOD AND APPARATUS OF FREE-SPACE OPTICAL COMMUNICATION

FIELD OF THE INVENTION

This invention relates to free-space optical communication.

ART BACKGROUND

The advantages of free-space optical communication (FSO), such as high bandwidth and high signal directivity, have long been known. One of the known drawbacks of FSO is its susceptibility to scintillation. That is, turbulence and thermal phenomena create localized fluctuations in the atmospheric refractive index. A signal-carrying FSO beam passing through such fluctuations may be wholly or partially deflected due to optical refraction. One consequence is that at the receiving end, where the beam is focused onto an image spot, the image spot may wander in the image plane.

Moreover, FSO beams are typically generated as coherent laser beams. A coherent beam initially has a uniform wavefront, i.e., a phase that varies slowly with radial position over the leading face of the beam. A beam having a uniform wavefront is desirable because at the detector, it will experience relatively little destructive self-interference. However, a second effect of index fluctuations in the atmosphere is to distort the wavefront of the FSO beam. The distortions cause time-dependent, destructive self-interference of the beam at the detector, which leads, in turn, to fading of the received signal.

Some of the known solutions to the problems related to atmospheric scintillation use mechanical mirrors and adaptive optics to track the wandering beam and to correct the distorted wavefront. However, such solutions require bulky hardware components. Some of them also use a closed, iterative control loop of sensing and mechanical actuation that limits their performance. These drawbacks are particularly severe in the case of QAM and other advanced modulation methods for the FSO beam, for which reception is relatively sensitive to the fidelity of the amplitude and phase of the received signal.

SUMMARY OF THE INVENTION

We have provided a new solution, which makes use of the fact that different wavelengths will generally exhibit different fading characteristics in a propagation environment characterized by atmospheric scintillation. Our solution offers the possibility of open-loop adaptive processing that may be done purely in high-speed electronics. This allows for coherent processing across the wavefront and enables optical MIMO by taking advantage of the multipath propagation produced by the atmosphere.

In an embodiment, our solution involves collecting at least one FSO beam, demultiplexing the beam, by wavelength, into at least two sub-beams, detecting each sub-beam to produce an electrical output therefrom, and recovering a signal using complementary information from at least two of the electrical outputs.

DETAILED DESCRIPTION

Figure 1:
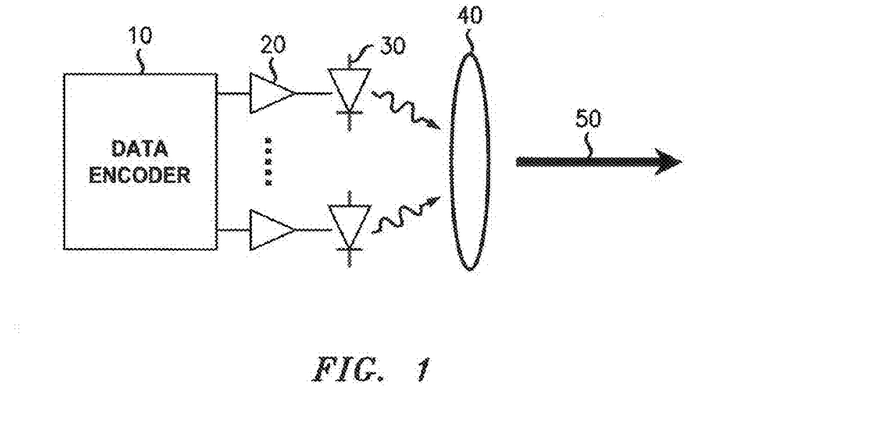
FIG. 1 is a simplified, partially schematic drawing of a transmitter according to the invention in an embodiment.

Turning to FIG. 1, an exemplary FSO transmitter includes a data encoder 10 for producing coded electrical signals that are applied after amplification stage 20 to modulate the optical output of two or more diode lasers 30. As seen in the figure, an optical system 40, which combines the functions of wavelength multiplexer and telescope, combines the optical outputs from the lasers into a beam 50 that is projected through space, typically through the atmosphere, toward a receiver.

Although only a single projected, wavelength-multiplexed output beam 50 is shown for simplicity of presentation, it will be understood that some advantages of spatial diversity may be achieved through arrangements in which multiple wavelength-multiplexed output beams are produced. This may be done, for example, by using multiple transmit apertures.

Numerous alternative implementations of the system shown conceptually in FIG. 1 will be apparent to those skilled in the art, using known techniques for data encoding, known techniques for optical signal generation, modulation, and amplification, and known arrangements for wavelength multiplexing and for telescopic arrangements for projecting one or more FSO beams into space. For example, optical multiplexers utilizing planar waveguide technology, such as arrayed waveguide (AWG) and multi-mode interference (MMI) devices, may be useful in at least some cases. Likewise, optical fiber amplifiers, such as erbium-doped fiber amplifiers (EDFAs) may be useful in at least some cases.

Preferred methods of data encoding for optical transmission rates of 10 Gbps and above include PSK, QAM, and OFDM. Additionally, it may be advantageous in at least some cases to employ space-time block codes and the like, in which the coded constellation symbols are arranged in space-time matrices or wavelength-time matrices, or over matrices that extend in space, time, and wavelength. (A space-time matrix distributes the signal over multiple output sub-apertures and multiple symbol intervals. A wavelength-time matrix distributes the signal over multiple wavelength subchannels and multiple symbol intervals.)

Figure 2:
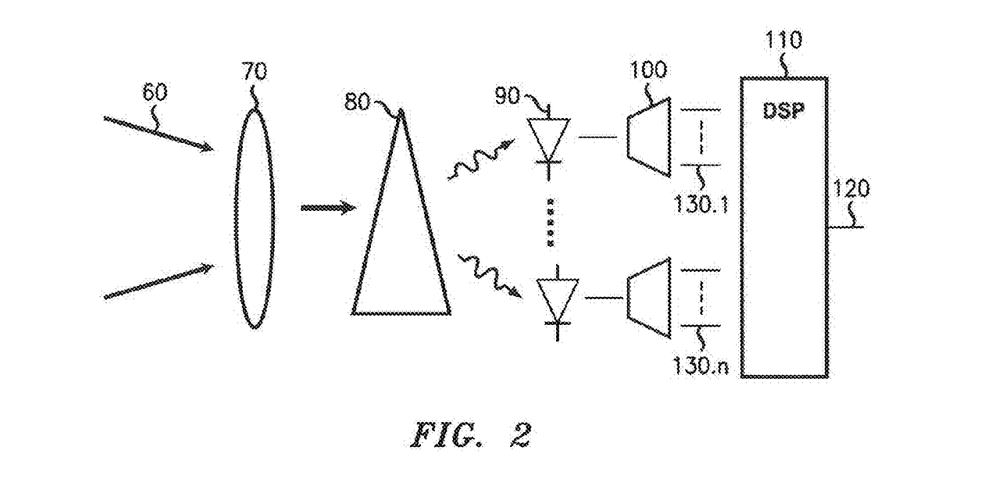
FIG. 2 is a simplified, partially schematic drawing of a receiver according to the invention in an embodiment.

Turning to FIG. 2, an exemplary FSO receiver for the incoming beam 60 from the transmitter includes a telescopic collection system 70, a wavelength demultiplexer 80, diode photodetectors 90, analog-to-digital converters (ADCs) 100, and digital signal processor (DSP) 110. As seen in the figure, demultiplexer 80 separates the incoming beam into two or more sub-beams that occupy different wavelength bands. Each sub-beam is converted to an electrical signal by one of photodetectors 90. At the ADCs 100, the coded constellation symbols are recovered and de-mapped to binary sequences, which are processed in DSP 110 to produce output data stream 120.

Numerous alternative implementations of the system shown conceptually in FIG. 2 will be apparent to those skilled in the art, using known techniques for data decoding, known techniques for optical signal detection and demodulation, and known arrangements for wavelength demultiplexing and for telescopic arrangements for collecting one or more FSO beams. For example, optical demultiplexers utilizing planar waveguide technology, corresponding to the optical multiplexers discussed above, may be useful in at least some cases.

As seen in the figure, the DSP has multiple input streams, each corresponding to one of the wavelength channels that are demultiplexed into respective sub-beams. The DSP uses complementary information from at least two, and preferably from all, of these wavelength channels in order to compute the output data stream 120.

For example, redundant information may be sent on each of two or more wavelength channels. In such a case, the DSP may select for a period of time that wavelength channel (or that subset of wavelength channels) that is strongest. By "strongest" is meant that which affords the greatest probability of accurate reception. Strength may be measured by signal-to-noise ratio, by error probability as determined from pilot signals sent on the pertinent wavelength channel, or by other well-known means. The period of time during which a particular channel selection persists may be determined, for example, by measurements of the coherence time of the propagation environment, which in some cases may be several milliseconds. According to such an approach, the information in different wavelength channels is "complementary" in the sense that the same information that is received weakly in one channel may be received more strongly in another.

Information in different wavelength channels may also be "complementary" because different channels carry distinct data streams. That is, data encoder 10 of FIG. 1 may operate to allocate different portions of a data stream to different wavelength channels. Such allocated portions may be entirely distinct, or, by redundant coding, they may contain partially overlapping data.

In at least some cases, it will be advantageous for DSP 110 to implement a diversity receiver. In a diversity receiver, the respective data streams 130.1, . . . , 130.n that are input to the DSP are assigned different weights. The set of weights is computed to minimize an error probability, based on pilot signals received from the transmitter. In such a case, the information on the different frequency channels is "complementary" because when combined in the DSP according to its assigned weight, each channel contributes to an optimized received signal.

In at least some cases, it will be advantageous for DSP 110 to implement MIMO techniques to recover the signal from space-time matrices, frequency-time matrices, and the like. As will be discussed below, such processing may include the use of propagation coefficients obtained, for example, from measurements made using pilot signals received from the transmitter. Separate pilot signals may be sent on different wavelength channels as well as from different transmitter sub-apertures. Likewise, pilot signals may be received in different receiver sub-apertures. Accordingly, a matrix of propagation coefficients may be determined for each wavelength channel. Within each such matrix, a given coefficient expresses an attenuation and a phase delay between a given transmitter sub-aperture and a given receiver sub-aperture. The use of such matrix information will be described further, below.

Figure 3:
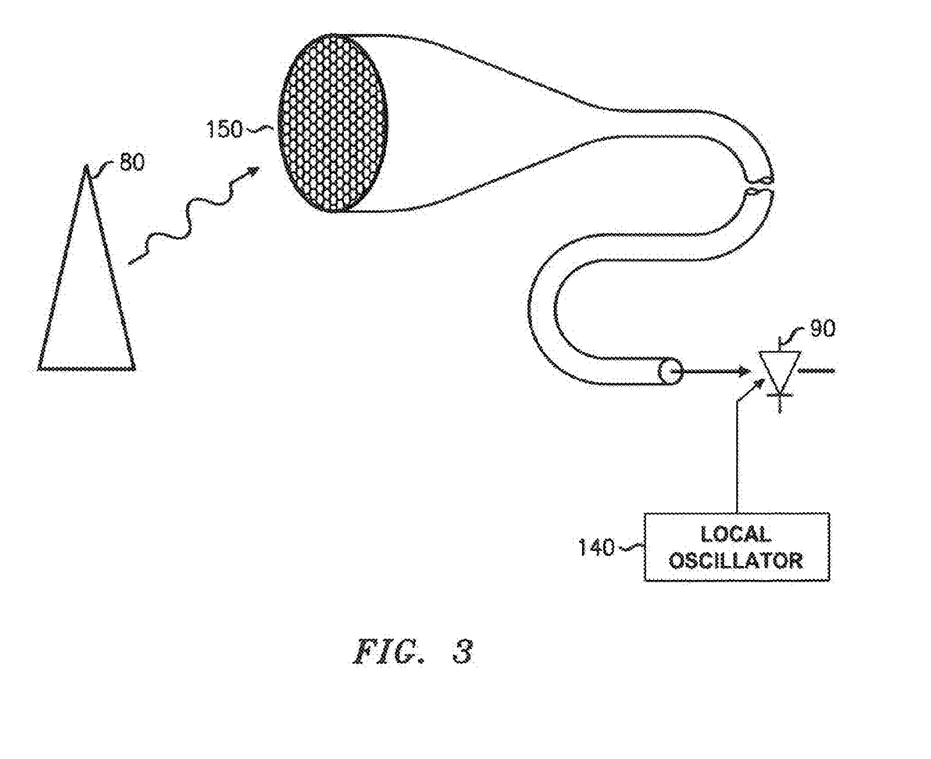
FIG. 3 is a simplified, partially schematic drawing showing a detail of the optical portion of a receiver in one embodiment. For simplicity of presentation, an optical hybrid has been omitted from the view of FIG. 3. A hybrid would typically be used to achieve phase diversity.

Turning to FIG. 3, a detail of the receiver arrangement of FIG. 2 includes local oscillator 140, which provides phase information to photodetector 90 in order to enable coherent detection. Coherent detection is necessary if the phase of the received optical signal is to be taken into account in the receiver. This is important for PSK, QAM, and other advanced modulation formats, as well as for MIMO processing that takes into account the propagation coefficients, as will be discussed below. (Those skilled in the art will understand that for coherent detection, an optical hybrid is typically included in the receiver arrangement just prior to photodetector 90. For simplicity of presentation, the optical hybrid has been omitted from the figure.)

FIG. 3 also shows tapered fiber bundle 150 (not drawn to scale), which collects light from demultiplexer 80 into a plurality of individual fiber endfaces and concentrates it into a single output fiber for input to photodetector 90. By this means, a relatively large optical aperture is provided for collecting the optical signal. Thus, for example, there are known tapered fiber bundles that employ an adiabatic taper to efficiently couple the collected light into a single-mode output fiber for efficient detection. One benefit of the large aperture that is afforded by this technique is greater tolerance to beam wander.

In other embodiments, the tapered fiber bundle may be replaced by a single fiber tapered from a large core (at the focus of the optical telescope) to a small core, thus adiabatically guiding the light into a single-mode (small core) output fiber.

The arrangement of elements as shown in FIG. 3 should be understood conceptually, and as representing a variety of possible alternative implementations.

Figure 4:
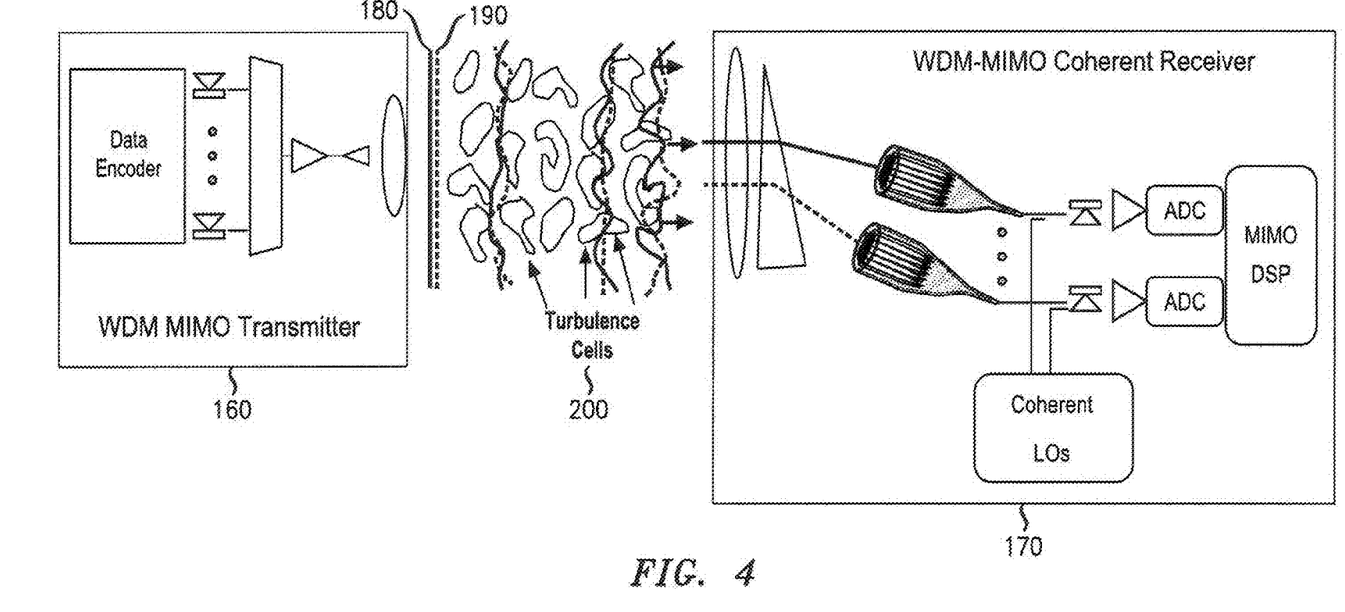
FIG. 4 is a simplified, partially schematic drawing of a FSO transmission system transmitting through a propagation environment characterized by atmospheric turbulence.

In a broad sense, one of the principles that FIG. 3 is intended to illustrate is that a tapered fiber is useful for mitigating the detrimental effects of beam wander. That is, beam wander (and to some extent also wavefront distortion) tends to smear out the focal spot of the optical system. If, in one of the focal planes of the optical system, the collected light is injected into the wide aperture of a tapered fiber or a tapered fiber bundle, the light can adiabatically returned to a concentrated spot. As shown in FIG. 4, which will be discussed below, such a taper may be duplicated for each of the respective wavelength channels to be collected from the wavelength demultiplexer.

Accordingly, it will be understood that it is advantageous for the entrance end of the tapered fiber or fiber bundle to have a large effective core, that a fiber bundle achieves this with a total core that is the effective sum of the cores of the constitutent fibers, and that an alternative is to use a tapered single fiber having (initially) a relatively large core. In at least some cases, the approach using a single tapered fiber may be the most advantageous because the single fiber suffers less optical loss due to the cladding covering part of the aperture. A single-fiber taper may also be simpler to fabricate, because it is free of the exacting path-length tolerances that may need to be imposed on a tapered fiber bundle in order to mitigate interference between the fibers that constitute the bundle.

As noted above, both beam wander and wavefront distortion are undesirable phenomena that tend to degrade the performance of the communication system. Wavefront distortion becomes more damaging as data rates increase, because the resulting spread in the propagating wavefront may become comparable to the spacing between successive pulses in the modulated light beam.

In order to be able to effectively mitigate the effects of wavefront distortion, it is advantageous to use an effective optical aperture for the detector that is less than one coherence length, or to subdivide the total aperture into subapertures, each having its own detector or detectors. Each subaperture is also advantageously provided with its own wavelength demultiplexer situated prior to the respective detector or detectors.

It will be seen that FIG. 3 depicts an arrangement in which the entrance to the taper (i.e. to the tapered fiber or tapered fiber bundle) is situated at a focal point of the optical system that lies downstream of wavelength demultiplexer 80. (It should be noted in this regard that the compound optical systems that are typical of free-space optical communication devices generally have multiple foci, so that the focal spot of the telescope gets re-mapped multiple times.)

In an alternative arrangement, the wavelength demultiplexer is situated downstream of the taper. In particular, it could be advantageous to situate the entrance to a single-fiber taper in a focal plane of the telescope, and to direct the collected light through the tapered fiber to a single-mode wavelength demultiplexer. Such devices are desirable because they are compact and they are readily fabricated using known techniques. Single-mode fibers can be used to route the output signals from the wavelength demultiplexer to respective photodetectors.

However, it should be noted that such an arrangement may be most suitable when wavefront distortion is of lesser concern, so that a single large aperture can be tolerated for collecting the light injected into the taper.

Cases of larger wavefront distortion can be handled by the use of multiple fiber tapers (by using, for example, a fiber taper bundle) at the focal plane of the telescope. In such cases, the multiple fiber tapers effectively divide the focal spot into a set of coherent sub-patches, each of which can be processed in the same manner as in the case of a single fiber taper. Each fiber taper is then followed by a single-mode wavelength demultiplexer and by detectors for the individual wavelengths.

Once the optical signals are converted to electrical signals, the wavefront distortion can be measured across the sub-patches and across wavelengths, and it can be corrected. This enables the implementation of adaptive optics in the electronic domain. Furthermore, such electronics-based adaptive optics is more flexible than conventional adaptive optics because it permits the amplitude and the phase to be controlled independently for each wavelength. This, in turn, enables more specific compensation for the wavefront distortions.

FIG. 4 shows a transmitter 160 projecting an FSO beam to a receiver 170. (Some elements of FIG. 4 having counterparts in preceding figures are indicated by like reference numerals.) Two wavefronts 180 and 190 of the beam are shown in FIG. 4. A wavefront is a surface of constant phase. As seen in the figure, the wavefronts become distorted as they pass through cells 200 of atmospheric turbulence. Because the amount of phase distortion is dependent on wavelength, signals in different wavelength channels experience different phase distortions. After propagation through a sufficient distance, the phase distortions in the respective wavelength channels become mutually decorrelated. Such decorrelation makes it possible to achieve certain gains at a receiver which, as discussed above, performs separate photodetection on two or more distinct wavelength channels.

Figure 5:
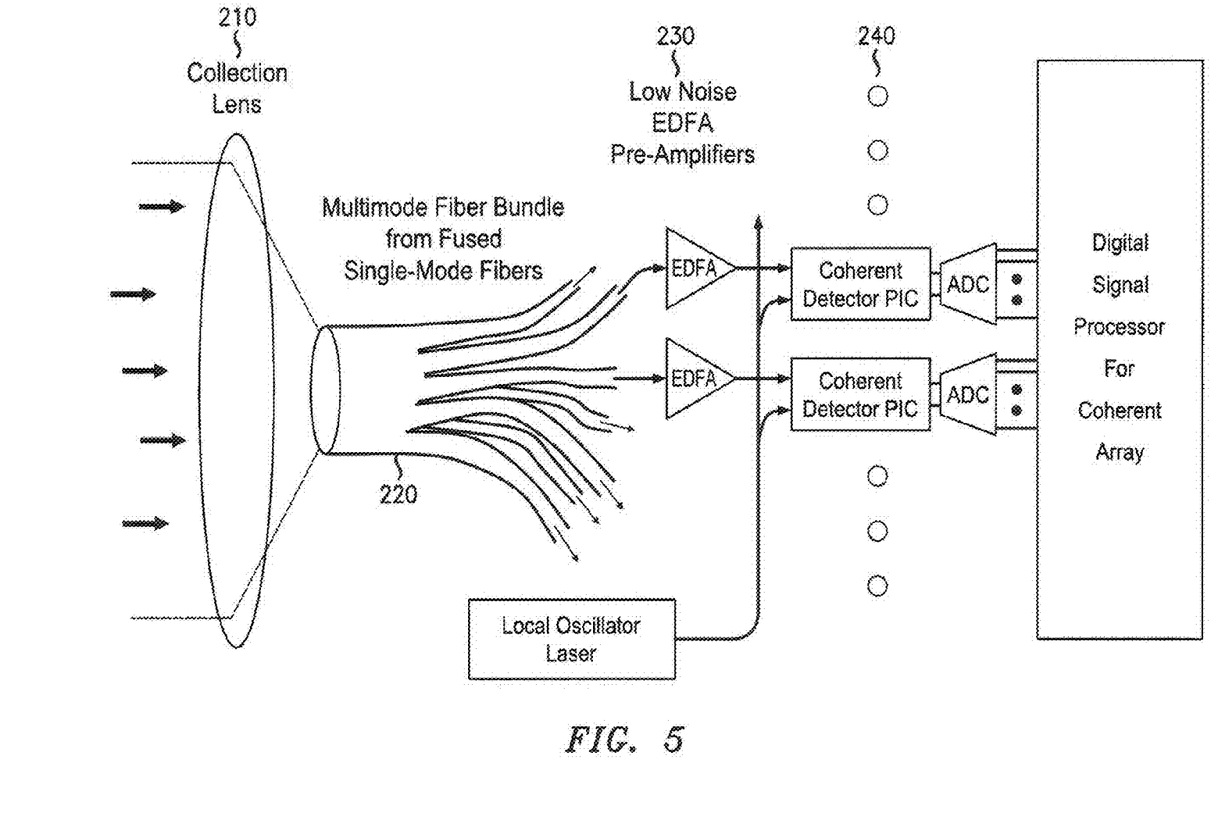
FIG. 5 is a simplified, partially schematic drawing of an exemplary FSO receiver having multiple receive apertures.

FIG. 5 shows a detail of a receiver in which collection lens 210 directs collected light onto the large-aperture face of multimode fused fiber bundle 220. (Some elements of FIG. 5 having counterparts in preceding figures are indicated by like reference numerals.) The fiber bundle distributes the collected light into a plurality of single-mode fibers, each of which terminates at a respective detection chain including a preamplifier 230, which is for example an EDFA, and coherent photodetector 240. Those skilled in the art will appreciate that a similar arrangement may be operated in reverse, i.e. as a transmitter of light emitted by multiple laser sources instead of as a receiver of light directed onto multiple photodetectors.

When operated as a transmitter, such an arrangement is one possible source (among various others) of signals carried in multiple, spatially diverse sub-beams. Spatial diversity is most effective when the separation between the effective apertures for the respective sub-beams (in either transmission or reception) is comparable to, or greater than, a pertinent coherence length. For example, the pertinent coherence length may be the coherence length of the distorted wavefront in the object or image plane, respectively, of the transmission or reception telescope.

Coherence lengths are readily computed from the theory of two-frequency mutual coherence functions in turbulent media, which is discussed below.

Those skilled in the art will appreciate further that spatial diversity may be achieved in both transmission and reception by pairing a transmitter and a receiver that both have multiple apertures according, for example, to the arrangement of FIG. 5. It will be understood that in such a case, there will be a complex propagation coefficient by for each pair consisting of a transmit aperture i and a receive aperture j. As noted, each propagation coefficient represents a respective attenuation value and phase delay. For sufficient propagation distances, the various propagation coefficients $h_{ij}$ will be mutually uncorrelated. We refer to a configuration in which there are N transmit apertures and M receive apertures as an N×M MIMO configuration.

The propagation coefficients can be measured using coherent detection of optical pilot signals, according to methods well known to those versed in radiofrequency MIMO technology. Generally, the propagation coeffients may be treated as quasi-static for the coherence time of the atmospheric propagation channel.

As is well known in the field of MIMO, the optical outputs of the transmit apertures during a symbol interval may be described as a vector x, and the optical inputs at the receive apertures as a vector y. In such a notation, the coupling between each of the transmit apertures and each of the receive apertures may be described by a matrix H whose entries are the propagation coefficients $h_{ij}$. Accordingly, the total optical signal arriving at a given receive aperture, including the effects of optical fading caused by the phase distortions described above, may be expressed as the vector product of x (if x is taken as a row vector) times that column of H that corresponds to the given receive aperture. The same is generally true at each of the multiple receive apertures.

One consequence is that if H can be effectively inverted, the distortions caused by atmospheric turbulence (as averaged over each spatial sub-beam) can be corrected through numerical processing, and in effect, the undistorted wavefronts can be recovered. It follows that signal loss due to fading can be at least partially reversed, and a stronger signal can be recovered.

In one example, a single transmit stream is transmitted. It may be transmitted from a single transmit aperture or from multiple transmit apertures. In the case of a single transmit stream, the matrix H reduces to a single row, and the pertinent processing of the received signal is equivalent to the coherent combination of the various versions or the signal received from the respective receive apertures or subapertures. In theory, this corresponds to the result that is sought using adaptive optics. However, our approach can achieve this result without using a control loop, and it can adjust for both the amplitude and the phase of the received signals.

Furthermore, our approach can be applied in cases where the time delay due to the propagation is significant relative to the symbol duration. Such cases are not adequately treated, in general, by traditional methods of adaptive optics.

A number of techniques for achieving an effective inversion of H are well known in the field of radiofrequency MIMO, and they may also be applied to optical MIMO as described here.

The optical MIMO techniques described here may be applied in a single wavelength channel, or in any number of wavelength subchannels.

As noted above, the theory of two-frequency mutual coherence functions in turbulent media provides a framework for calculating coherence lengths. The same theory also provides a framework for calculating the coherence bandwidth (which is also referred to as the correlation or decorrelation bandwidth). For example, a theoretical calculation of the coherence bandwidth for the case of strong scintillation is given in A. Ishimaru, *Wave Propagation and Scattering in Random Media*, Volume 2 (1978) 424-426. A theoretical calculation for the case of weak scintillation case is given in L. Andrews and R. L. Phillips, *Laser Beam Propagation through Random Media* (1998) 150-152.

Those skilled in the art will appreciate that for effective operation, the spacing between the respective wavelength bands assigned to the various sub-beams should be at least the coherence bandwidth, so that wavelength-based decorrelation between sub-beams can take place. Those skilled in the art will appreciate further that the total bandwidth spanned by the sub-beams should lie within the amplification bandwidth of the receiver. Accordingly, the amplification bandwidth imposes an upper limit on the wavelength spacing.

It will be appreciated further that the coherence bandwidth depends on the average wavelength, the range (i.e., the transmission distance), and the level of turbulence in the transmission path. Thus, for a given range and turbulence level, it is advantageous to select the average wavelength such that the constraints described above can be satisfied using appropriate optical amplifiers.

What is claimed is:

1. A method, comprising:
   collecting at least one free space optical beam;
   directing the beam to a fiber bundle;
   demultiplexing the beam by wavelength into two or more sub-beams;
   outputting the two or more sub-beams separated at least by the coherence bandwidth, the two or more sub-beams being associated with complementary information;
   detecting the two or more sub-beams to produce electrical outputs corresponding to each of the two or more sub-beams and associated with the complementary information;
   selecting at least two of the electrical outputs based on a strength, an assigned weight or a propagation coefficient of the complementary information associated with the at least two electrical outputs to recover a signal during a time interval; and
   recovering the signal using the complementary information.

2. The method of claim 1, wherein the recovering step comprises, during each of a plurality of time intervals, selecting that sub-beam which provides the strongest signal.

3. The method of claim 1, wherein the signal is recovered in a diversity receiver.

4. The method of claim 1, further comprising receiving phase and amplitude information on the two or more sub-beams via a local oscillator.

5. The method of claim 4, wherein the recovering step comprises, during each of a plurality of time intervals, selecting at least one sub-beam based on the received phase and amplitude information.

6. The method of claim 4, wherein the recovering step comprises, during each of a plurality of time intervals, weighting the sub-beam outputs with respective weights derived from received pilot signals on the two or more sub-beams.

7. The method of claim 1, further comprising, after the demultiplexing step, directing each of the two or more sub-beams onto an array of two or more spatially separated subapertures; and wherein the detecting step comprises separately detecting light collected in each of the subapertures, thereby to produce, for each wavelength-demultiplexed sub-beam, a multi-component electrical output having one component for each of at least two said subapertures.

8. Apparatus comprising:
   an optical telescope;
   a wavelength demultiplexer arranged to:
      separate light selected by the telescope into two or more sub-beams occupying different wavelength bands; and
      output the two or more sub-beams separated at least by the coherence bandwidth, the two or more sub-beams being associated with complementary information;
   a detector stage arranged to:
      convert the two or more sub-beams to electrical outputs corresponding to each of the two or more sub-beams and associated with the complementary information; and
      select at least two of the electrical outputs based on a strength, an assigned weight or a propagation coefficient of the complementary information associated with the at least two electrical outputs to recover a signal during a time interval; and
   a receiver in receiving relationship to each of the sub-beam outputs and configured to recover the signal using the complementary information.

9. Apparatus of claim 8, wherein the receiver is a diversity receiver, the apparatus further comprises a memory for storing weights computed from pilot signals on the respective sub-beams, and the receiver is configured to apply the weights to their respective sub-beam outputs.

10. Apparatus of claim 8, wherein the receiver stage comprises a decoding stage configured to map constellation symbols received in the two or more sub-beams to binary bitstreams.

11. Apparatus of claim 8, wherein the receiver is configured to assemble an output stream of data from a plurality of distinct substreams of data that have been received on different sub-beams.

12. A system, comprising:
   the apparatus of claim 8; and
   a transmitter, comprising:
      at least two optical sources, each configured to produce a modulated sub-beam in a distinct wavelength band;
      an optical multiplexer configured to combine the sub-beams into a beam; and
      a telescope configured to project the beam into space.

13. A method, comprising:
   collecting at least one free space optical beam onto an array of two or more spatially separated subapertures, thereby defining one sub-beam for each subaperture;
   outputting each of the sub-beams, each of the sub-beams being associated with complementary information;
   detecting each of the sub-beams to produce electrical outputs corresponding to each of the sub-beams and associated with the complementary information;
   controlling amplitude and phase independently for each wavelength according to electronics-based adaptive optics;
   selecting at least two of the electrical outputs based on a strength, an assigned weight or a propagation coefficient of the complementary information associated with the at least two electrical outputs to recover a signal during a time interval; and recovering the signal using the complementary information.

14. The method of claim 13, further comprising receiving the phase and amplitude information on the two or more sub-beams via a local oscillator.

15. The method of claim 14, wherein the recovering step comprises, during each of a plurality of time intervals, weighting the sub-beam outputs with respective weights derived from received pilot signals on the two or more sub-beams.

16. The method of claim 13, wherein the collecting step comprises collecting two or more free space optical beams onto the subaperture array, wherein each of the collected beams represents one of two or more exit subapertures of a remotely situated optical transmitter.

17. An apparatus comprising:
an optical telescope;
an array of two or more spatially separated entrance subapertures, each said subaperture arranged to:
define a respective sub-beam; and
output a respective sub-beam;
a detector stage arranged to:
convert two or more sub-beams to produce electrical outputs corresponding to each of the two or more sub-beams, each of the two or more sub-beams being associated with complementary information; and
select at least two of the electrical outputs based on a strength, an assigned weight or a propagation coefficient of the complementary information associated with the at least two electrical outputs to recover a signal during a time interval;
a controller adapted to control amplitude and phase independently for each wavelength according to electronics-based adaptive optics; and
a receiver in receiving relationship to each of the sub-beam outputs and configured to recover the signal using the complementary information.

18. A system, comprising:
the apparatus of claim 17; and
a transmitter, comprising:
an optical source having at least two spatially separated exit subapertures, each defining a respective modulated sub-beam; and
a telescope configured to project the beam into space.

19. The system of claim 18, further comprising a digital processor and memory configured to compute a propagation coefficient between each said exit subaperture and each said entrance subaperture.

20. The method of claim 13, wherein the controlling step is performed without a control loop.

* * * * *